(12) United States Patent
Karidi

(10) Patent No.: US 7,177,049 B2
(45) Date of Patent: Feb. 13, 2007

(54) IMAGE RECONSTRUCTION ARCHITECTURE

(75) Inventor: Ron J. Karidi, Chicago, IL (US)

(73) Assignee: Electronics For Imaging, Inc., Foster City, CA (US)

( * ) Notice: Subject to any disclaimer, the term of this patent is extended or adjusted under 35 U.S.C. 154(b) by 309 days.

(21) Appl. No.: 10/428,503

(22) Filed: May 2, 2003

(65) Prior Publication Data
US 2003/0193680 A1  Oct. 16, 2003

Related U.S. Application Data

(63) Continuation of application No. 09/314,573, filed on May 18, 1999, now Pat. No. 6,590,676.

(51) Int. Cl.
H04N 1/58 (2006.01)
H04N 1/60 (2006.01)

(52) U.S. Cl. ............ 358/1.9; 358/1.13; 358/518; 358/530

(58) Field of Classification Search ............ 358/1.9, 358/501, 515, 518, 524, 527, 530, 1.13, 3.08, 358/3.24, 3.26, 3.27
See application file for complete search history.

(56) References Cited

U.S. PATENT DOCUMENTS

| | | | |
|---|---|---|---|
| 4,642,680 A | * | 2/1987 | Yamada ............ 358/524 |
| 5,212,770 A | | 5/1993 | Smith et al. |
| 5,384,648 A | | 1/1995 | Seidner et al. |
| 5,467,412 A | | 11/1995 | Capitant et al. |
| 5,546,474 A | | 8/1996 | Zuniga |
| 5,715,070 A | | 2/1998 | Tone et al. |
| 6,078,697 A | | 6/2000 | Ng |

FOREIGN PATENT DOCUMENTS

EP   0841808 A2   5/1998

* cited by examiner

Primary Examiner—Scott A. Rogers
(74) Attorney, Agent, or Firm—James Trosino

(57) ABSTRACT

Methods and apparatus for reconstructing digitized images are provided that include an image reconstruction path that receives a digitized image and provides a processed RGB or CMYK image that may be printed or stored in memory. The image reconstruction path is configured to operate in either a multiple scan or single scan environment if the source of the digitized image is a scanner. A plurality of optional functional units in the reconstruction path can be controlled by user or internal controls. These functional units perform preliminary color adjustment, automatic deskew, background and dust removal, descreen, text detection and enhancement, color conversion, scaling, and color manipulation.

6 Claims, 5 Drawing Sheets

IMAGE RECONSTRUCTION ARCHITECTURE

REFERENCE TO RELATED APPLICATIONS

This application is a continuation of U.S. application Ser. No. 09/314,573, filed 18 May 1999, now U.S. Patent No. 6,590,676.

FIELD OF THE INVENTION

The invention relates digitized image processing systems, and in particular to image reconstruction architectures in which digitized images that are obtained from an image source, such as a scanner, are processed for output to an output device, such as a printer.

BACKGROUND

Image processing systems typically are used to adjust and correct image signals. For example, when printing a digitized image, such adjustments and corrections can include: color adjustment, deskewing, background and dust removal, descreening, text detection, text enhancement, color conversion, scaling and color manipulation.

In most image processing systems, digitized image signal correctors perform the adjustments or corrections based on processing parameters provided by a system operator. The task of selecting the appropriate processing parameters for these correctors to achieve certain desired output results is normally left to the operator, and is one of the more difficult tasks in image processing. As the complexity of the image processing model grows with advances in image processing technology, this task has become even more difficult.

For most adjustments or corrections, the operator typically does not want to know about the particular processing parameters being used, but instead wants to achieve the desired output results. Thus, it is desirable to determine optimal processing parameters for digitized image signal correctors automatically to achieve specified output results for an image.

Examples of previously known automatic or semi-automatic image processing systems include Spiegel et al. U.S. Pat. No. 5,615,282 and Capitant et al. U.S. Pat. No. 5,467, 412. Such previously known systems, however, provide only limited image reconstruction capability. For example, such systems do not incorporate descreening or text detection facilities, and therefore an image reconstruction subsystem must be appended thereto. Further, such systems do not provide multiple data paths (e.g., for single and multiple scans) and do not support both contone and 1-bit printing.

It would be advantageous to provide improved methods and apparatus for reconstructing digitized images.

SUMMARY

The invention provides improved methods and apparatus for reconstructing digitized images. The invention processes one or more color formats (e.g., contone or 1-bit), and readily operates with image sources that can include both single and multiple scan systems. For purpose of the discussion herein, multiple scan refers to systems that scan an image once per print separation. That is, for a CMYK printing system, the image is scanned four times, and printing separations for C, M, Y, and K are generated one by one. In contrast, single scan refers to copy systems that scan an image once for all print separations. Thus, for a CYMK printing system, the image is scanned once.

An exemplary embodiment of the invention provides an image reconstruction path that receives a digitized image, for example, from a scanner or memory, and provides a processed RGB or CMYK image that may be printed or stored in memory. The image reconstruction path is configured to operate in either a multiple scan or single scan environment when the source of the digitized image is a scanner. Within the image reconstruction path, there are a plurality of functional units that can be controlled by user or internal controls, or that can be optionally bypassed. These functional units provide any of preliminary color adjustment, automatic deskew, background and dust removal, descreen, text detection and enhancement, color conversion, scaling, and color manipulation. It will be appreciated by those skilled in the art that other functions also may be provided.

An important feature of this architecture is that it is open-ended on both the input and output ends. This means that with the appropriate customization, the architecture is ready to accommodate different scanners at the input source and different printers at the output target.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

The invention provides improved methods and apparatus for reconstructing digitized images. One important feature of the invention includes the ability to process one or more color formats, e.g., contone or 1-bit, and to operate upon any image source. For purpose of the discussion herein, multiple scan refers to systems that scan an image once per print separation. That is, for a CMYK printing system, the image is scanned four times, and printing separations for C, M, Y, and K are generated one by one. In contrast, single scan refers to copy systems that scan an image once for all print separations. For example, for a CYMK printing system the image is scanned once.

Figure 1:
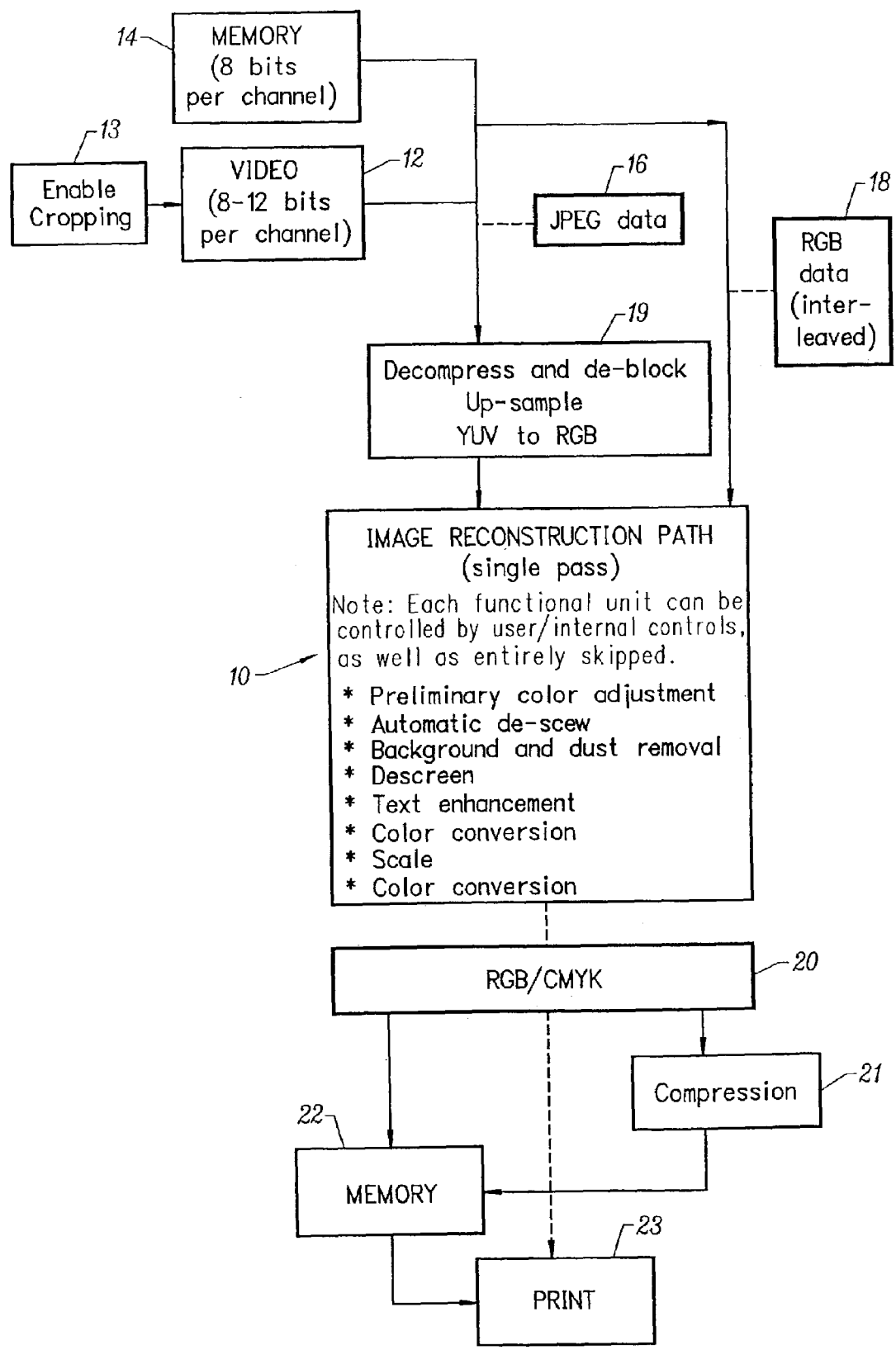
FIG. 1 is a block diagram of a digitized image processing system including an exemplary image reconstruction path in accordance with this invention.

Referring to FIG. 1, a digitized image processing system including an exemplary image reconstruction path in accordance with this invention is described. Image reconstruction path 10 accepts digitized image data from any of several sources, such as memory 14, video 12 (including data that may be cropped 13 or otherwise processed) JPEG or other image data 16 (such as GIF, TIFF, or PICT data), and RGB data 18 (e.g., from a scanner). In the case of video data, the system provides a mechanism, as is known in the art, for decompressing and deblocking the data, upsampling, and converting YUV to RGB 19.

Image reconstruction path 10 provides a front end capability for processing any type of digitized image data, although the internal operation of the image reconstruction path is based upon the ultimate receipt of digitized image data in an RGB format. Persons of ordinary skill in the art will understand that image reconstruction paths in accordance with this invention may be configured to operate on digitized image data in any format, and that the exemplary embodiment of the invention is provided solely for purposes of illustration and example and is not intended to limit the scope of the invention in any way.

Image reconstruction path 10 is for a single scan system. Referring to FIG. 2, an appropriate image reconstruction path for a multipass architecture is now described. In the image reconstruction path, each functional unit can be controlled by either of a user or by internal controls. Additionally, inclusion of each of the functional units in the image reconstruction path is optional. The system has as its default an automatic behavior which can be suppressed by the operator, either by turning some automatic functions ON or OFF, or by controlling the parameter settings for those functions. Accordingly, the apparatus and methods in accordance with this invention provide the flexibility to include only those functional units of interest to the user. In an exemplary embodiment of the invention, the user may select the desired functional units from a selection menu, such that the image reconstruction path is readily reconfigured for each job.

Functional units within the image reconstruction path may include any of:

Image rotation, duplexing, and tiling.

Preliminary color adjustment: this functional unit converts the word size of the input image data as desired, and thereby stretches the input data to a desirable dynamic range. For example, the preliminary color adjustment functional unit receives images data from the scanner at 8–12 bits per component and returns 8-bit adjusted RGB values through the use of one-dimensional curves. This is done by using a look-up-table (LUT) sized by the number of possible input combinations, e.g. 4096 entries for 12 bit input.

Automatic deskew: this functional unit performs small angle corrections for originals that are misplaced on the scanner's glass during the scanning process. Such techniques are well known in the art.

Background and dust removal: this functional unit removes noise, dust, and uniform background, as requested by the user. Such techniques are well known in the art.

Halftone detection: this functional unit detects areas of the image that were originally printed using a halftoning process, i.e., screen or error diffusion. One such halftone detection process is described in Karidi U.S. Pat. No. 6,185,335, which may be used to perform the function of this functional unit. The descreening algorithm disclosed therein preserves soft edges. Therefore, a preferred approach to halftone detection in the exemplary embodiment of the invention marks all possible screen areas for descreening unless sharp edge information is lost thereby, e.g., boundaries of graphics and characters. In exemplary embodiments of the invention, the halftone detection procedure is applied to the intensity component Y of the image. For each pixel, a decision is made whether the pixel is dark or light relative to its neighborhood (e.g., a 5×5 neighborhood). Each pixel is then considered with a surrounding window (e.g., a 9×9 surrounding window) and the size of the boundary set between the dark and light classes is measured. A pixel is marked as a halftone candidate only if the boundary size is less than a probabilistic estimate.

Descreen: this functional unit reconstructs a contone image from halftone data obtained during the halftone detection procedure described above. An exemplary descreening process is described in Karidi U.S. Pat. No. 6,222,641, which may be used to perform the function of this functional unit. In this procedure, an adaptive, edge-preserving low pass filter is applied to areas that are marked as halftone. For each pixel that is marked as halftone, a descreening kernel is applied to produce a smoothed neighborhood of the pixel. Within this smooth context, locations of those pixels whose values are within a certain threshold of the current pixel are marked. These locations are used to build a 0–1 mask that is applied to the low pass filter kernel. The masked kernel is then convolved with the original, i.e. non-smoothed, neighborhood of the current pixel. To avoid over-smoothing, the original pixel value is restored if the variation within the original window is smaller than one threshold, or the number of marked pixels is smaller than another threshold.

Text detection: this functional unit decides which parts of the image contain text. In exemplary embodiments of this invention, text comprises black text on a white background, although other text detection schemes may be used. An exemplary text detection process is described in Karidi U.S. Pat. No. 6,289,122, which may be used to perform the function of this functional unit.

Text enhancement: this functional unit makes the text clear and sharp. Exemplary embodiments of this invention only enhance black text on a white background. An exemplary text enhancement process is described in Karidi U.S. Pat. No. 6,185,335, which may be used to perform the function of this functional unit. In this exemplary embodiment of the invention, the ink component is processed. To determine the ink level, e.g., 0–255, where 0=white, from the intensity level, a one dimensional look up table (LUT) is applied. After resealing to the printing resolution, the total amount T of ink is a surrounding window (e.g., a 5×5 window) is measured. The number of pixels C that are darker than the current pixel are counted. In simplified form, a determination is made as follows: if (T>255× dot factor×C), then put ink in the current pixel; otherwise leave the pixel white. Text enhancement is preferably customized in 1-Bit systems, but need not in contone systems.

Color conversion: this functional unit converts from scanner color space to the printer/host color space. In an exemplary embodiment of the invention, the procedure interpolates a color table from the input color space (i.e. RGB) to the output color space (e.g. RGB or CMYK). The interpolation is either linear (i.e., tetrahedral) or multi-linear. The color table is a composition of the scanner calibration table (e.g., from scanner RGB to a standardized or proprietary RGB used by the image reconstruction path) and the printing engine's Color Rendering Dictionary (CRD). The inputs to this functional unit include text detection tags to ensure that black text is printed with black ink only. For pixels that were marked as text, a three dimensional table is not typically used. Rather, a separate, Y to K, one dimensional table is used.

Scale: this functional unit selects the image up/down to map print resolution and the user input. The exemplary embodiment of the invention uses bi-cubic interpolation. Interpolation for scaling is a well known technique.

Color manipulation: this function unit supports brightness, color saturation, and contrast adjustments. These functions are implemented through LUT's and linear operations (e.g. matrix multiplication).

After the image data have been processed via the image reconstruction path, the processed data are provided to an output module 20 that formats the image data as RGB/CMYK data, as appropriate for the output device. For example, the output device may be a computer memory 22, in which case the data may be maintained in an RGB format and/or compressed via a compression module 21. If the image data are to be provided to a printed by a printer 23, then the data are formatted as CMY or CMKY data for use by the printer.

Figure 2A:
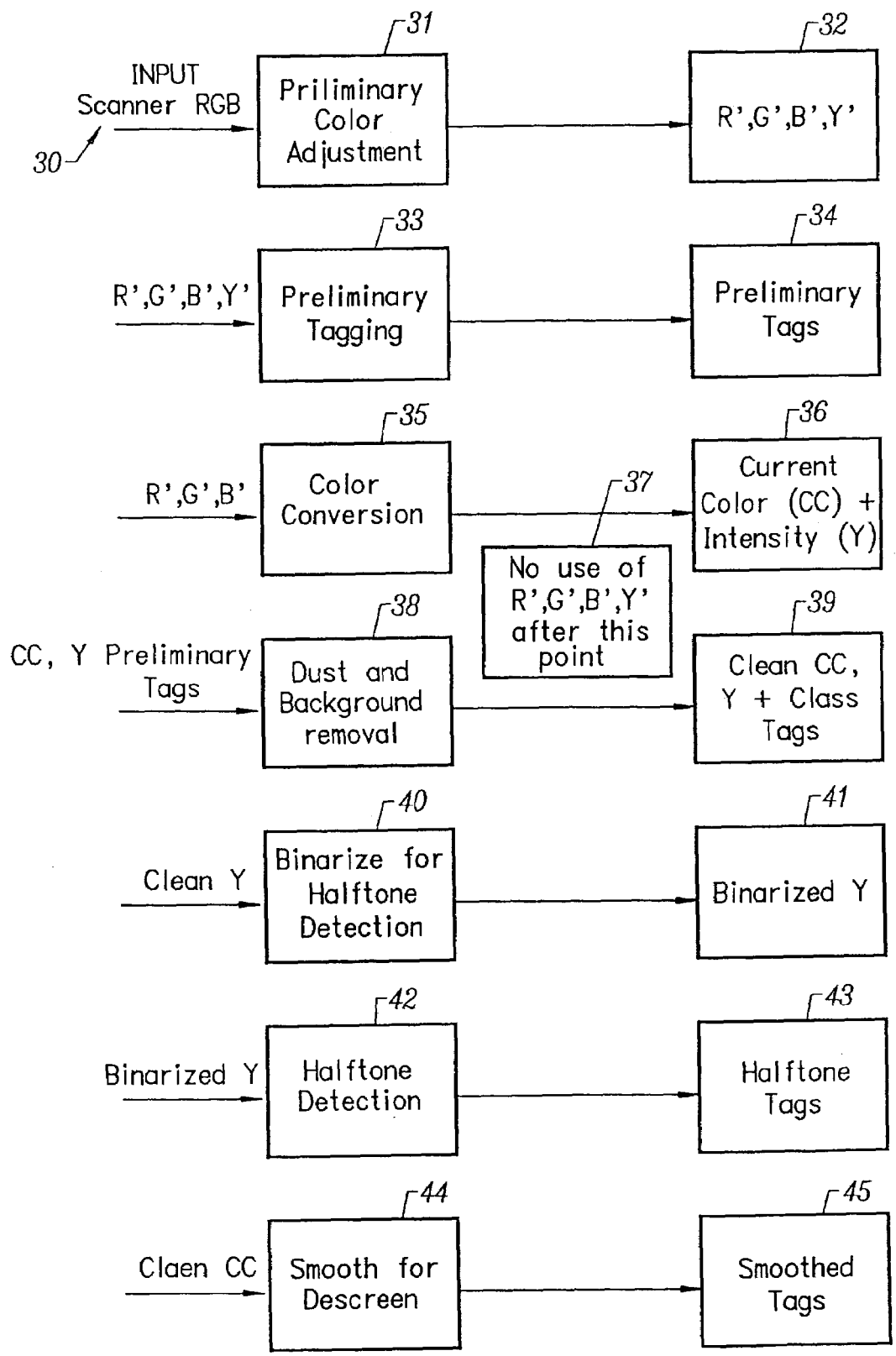
FIGS. 2a and 2b provide a processing flow diagram for an exemplary image reconstruction path that processes a multipass scanned image in accordance with this invention.
Figure 2B:
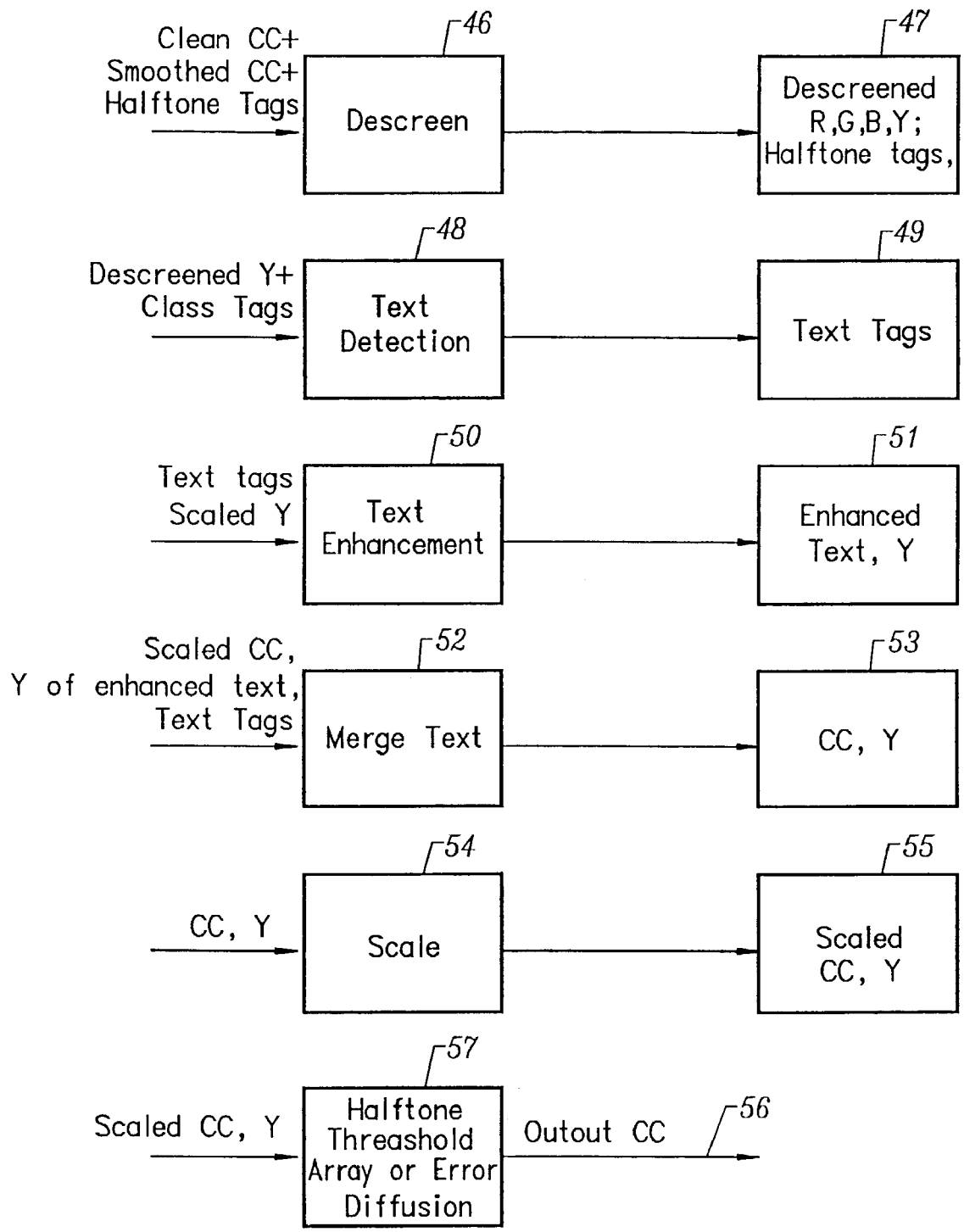

FIGS. 2a and 2b provide a processing flow diagram for an image reconstruction path that correspond to a multi-scan system in accordance with this invention. Thus, the processing flow shown on FIGS. 2a and 2b is traversed four times for a CMYK printer, once for each of the four separations. During an image scan, an input signal 30 is provided to the image reconstruction path. Preliminary color adjustment is performed 31, resulting in an R',G',B' and a Y' signal output 32. The image reconstruction path performs a preliminary tagging operation 33 to produce preliminary color tags 34.

The color conversion procedure 35 is next applied, resulting in a current color signal (CC) and an intensity signal (Y) 36. No use of R', G', B' or Y' information is made from this point on 37 in the image reconstruction path because processing now proceeds for a current color channel in the multi-scan cycle.

The current color and intensity information, along with the preliminary tags, is provided to the dust and background removal function 38, resulting in a clean current color signal, a clean intensity signal, and classification tags 39. Classification tags contain information related to color, e.g., an indication of how neutral a pixel is, whether a pixel is within an edge, or whether a pixel is in a high contrast region. The classification tags also record pixel locations for which background removal was applied.

The clean intensity signal is binarized for halftone detection 40, resulting in a binarized intensity signal 41. The binarized intensity signal is then applied to the halftone detection function 42 to produce halftone tags 43.

The clean current color information is smoothed for descreening 44, resulting in smoothed current color information 45. The clean current color information, smoothed current color information, and halftone tags are applied to the descreening functional unit 46, resulting in descreened Current Color and intensity information and halftone tags 47.

The descreened intensity information and the classification tags are then applied to the text detection functional unit 48, resulting in text tags 49. The text tags and scaled intensity information are provided to the text enhancement functional unit 50, resulting in enhanced text and intensity information 51.

The scaled current color, intensity value of the enhanced text, and text tags are applied to a merge text function 52, resulting in reconstructed current color and intensity information. The reconstructed current color and intensity information is applied to the scale functional unit 54, resulting in scaled current color and intensity information 55. The scaled current color and intensity information is applied to a halftone threshold array or error diffusion functional unit 57. Typically, a 1-bit system requires an error diffusion based halftone module, while a contone system requires a threshold array based halftone system. Thereafter, an output is provided 56 to the selected destination, e.g. printer or memory.

Figure 3A:
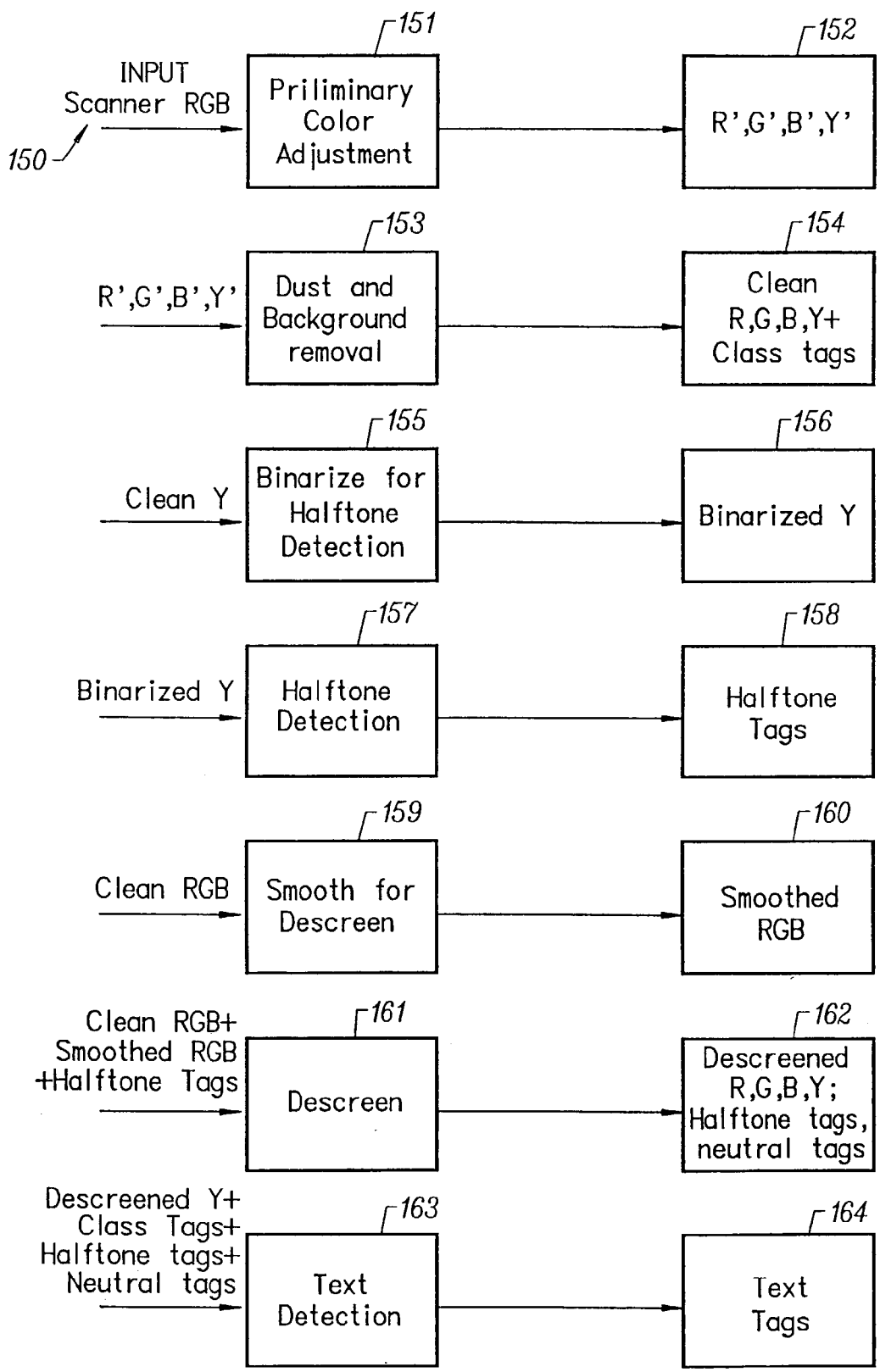
FIGS. 3a and 3b provide a processing flow diagram for an exemplary image reconstruction path within a single scan system in accordance with this invention.
Figure 3B:
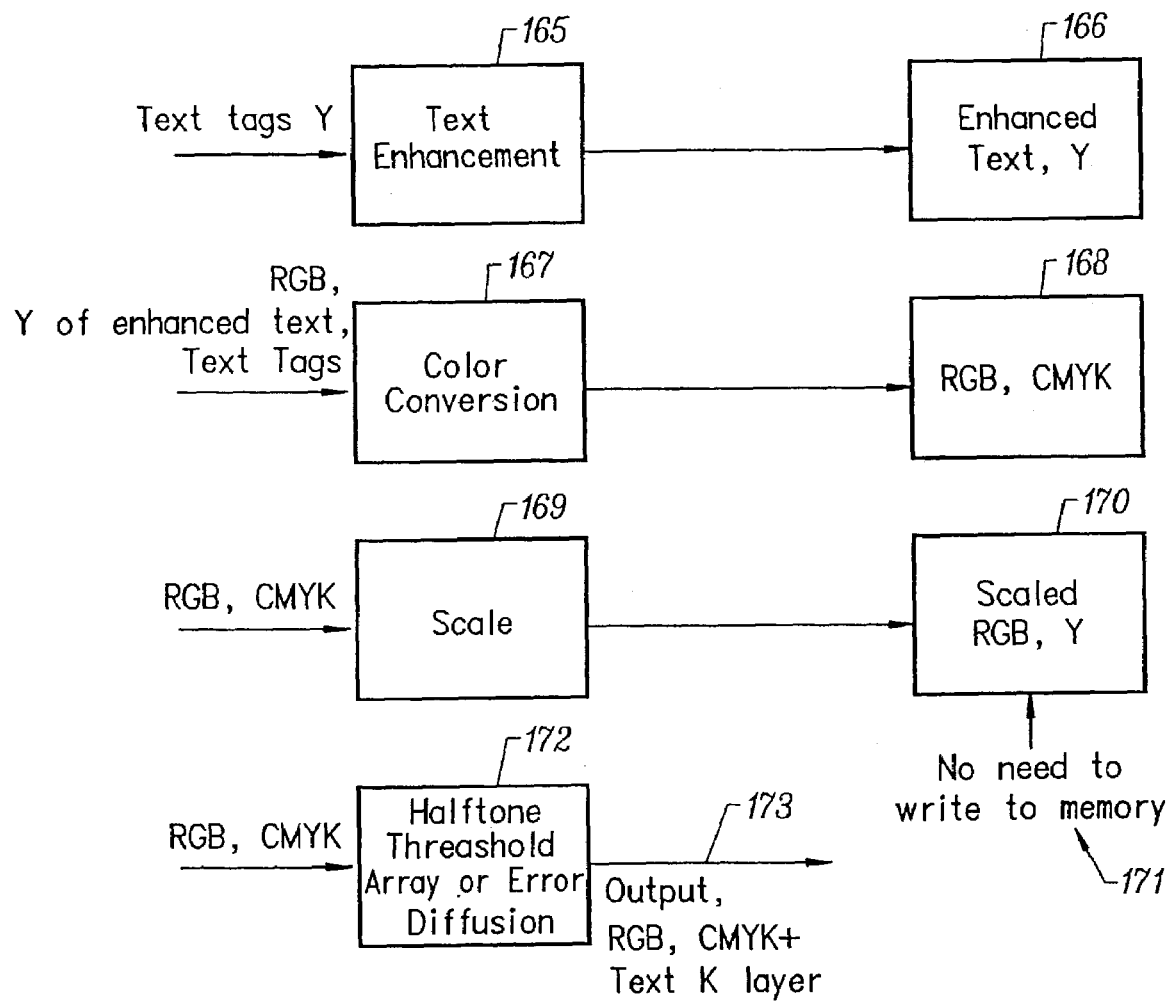

Referring now to FIGS. 3a and 3b, a processing flow diagram is described for an image reconstruction path in a single scan system in accordance with this invention. During a scan of an image by the scanner, an input RGB signal 150 is provided to the image reconstruction path. Preliminary color adjustment is performed 151, resulting in an R',G',B' and a Y' signal output 152.

The R',G',B' and Y' information is provided to the dust and background removal function 153, resulting in clean R,G,B and Y signals and class tags 154. The clean intensity signal is binarized for halftone detection 155, resulting in a binarized intensity signal 156. The binarized intensity signal is then applied to the halftone detection function 157 to produce halftone tags 158.

The clean RGB information is smoothed for descreening 159, resulting in smoothed RGB information 160. The clean RGB information, smoothed RGB information, and halftone tags are applied to the descreening functional unit 161, resulting in descreened R,G,B and intensity information, halftone tags, and neutral tags 162. Neutral tags are similar to classification tags and indicate whether a pixel is neutral or colored.

The descreened intensity information, class tags, halftone tags, and neutral tags are then applied to the text detection functional unit 163, resulting in text tags 164. The text tags and scaled intensity information are provided to the text enhancement functional unit 165, resulting in enhanced text and intensity information 166.

The RGB, intensity value of the enhanced text, and text tags are applied to a color conversion function 167, resulting in either of RGB or CMYK information 168. The reconstructed RGB or CMYK information is applied to the scale functional unit 169, resulting in scaled RGB and intensity information 170. There is no need to write this information to memory 171.

The RGB/CMYK information is applied to a halftone threshold array or error diffusion functional unit 172. Typically, a 1-bit system requires an error diffusion based halftone module, while a contone system requires a threshold array based halftone system. Thereafter, an output RGB/CMYK and text K layer signal is provided 173 to the selected destination, e.g. printer or memory.

The foregoing merely illustrates the principles of this invention, and various modifications can be made by persons of ordinary skill in the art without departing from the scope and spirit of this invention.

I claim:

1. A method for reconstructing a digitized image provided by a scanner or an image memory, the method comprising:
   providing the digitized image to an image reconstruction path for or producing RGB and CMYK output images, and that is selectively configurable to process images produced by single scan and multiple scan copy systems ; and
   providing the output images to any of a printer or an image memory.

2. The method of claim 1, wherein the digitized image comprises an image that is stored in any known format.

3. The method of claim 1, wherein the digitized image comprises any of video, image, and RGB data.

4. Apparatus for reconstructing a digitized image provided by a scanner or an image memory, the apparatus comprising:

means for providing the digitized image to an image reconstruction path for or producing RGB and CMYK output images, and that is selectively configurable to process images produced by single scan and multiple scan copy systems; and means for providing the output images to any of a printer or an image memory.

5. The apparatus of claim 4, wherein the digitized image comprises an image that is stored in any known format.

6. The apparatus of claim 4, wherein the digitized image comprises any of video, image, and RGB data.

* * * * *